Figure 1:
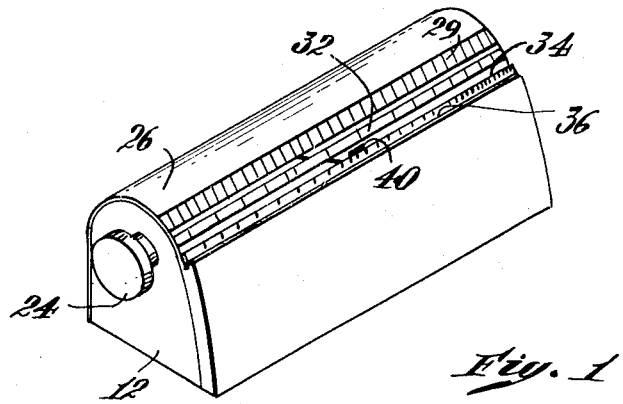

Aug. 18, 1964  A. J. EVANGELISTA  3,144,990
TYPE SIZE CALCULATOR
Filed Nov. 8, 1962

INVENTOR.
Anthony J. Evangelista
BY
Roberts, Cushman & Grover
ATT'YS

United States Patent Office 3,144,990
Patented Aug. 18, 1964

3,144,990
TYPE SIZE CALCULATOR
Anthony J. Evangelista, Boston, Mass., assignor to Boston Herald-Traveler Corporation, Boston, Mass., a corporation of Massachusetts
Filed Nov. 8, 1962, Ser. No. 236,320
5 Claims. (Cl. 235—79.5)

This invention relates to a type size calculator and is an improvement over the form of apparatus illustrated in my Patent No. 2,378,473 issued June 19, 1945, and entitled Apparatus for Assembling Type Characters.

In the apparatus disclosed in the aforesaid patent a holder was provided which held a plurality of supports or cards. Each card carried a display of one style of type face and a scale which was divided into sections corresponding to the different type size. By positioning a logarithmic scale adjacent the scale on the card, the size of type could be determined which would fit a given character count into a given line length. However, the comparison of several type styles for the best fit was complicated by the need to change supports or display cards.

Objects of the present invention are to provide a type size calculator for performing operations of the type described above with greater speed and accuracy and with greater facility in the comparison of different type styles.

The present invention is based upon the discovery that, in print shops in which apparatus of this character is most usefully employed, there is little need for a display of each type style because the printers are sufficiently familiar with their characteristics. Thus each type style may be sufficiently identified by its title and, in many cases, by an arbitrary number assigned to the style.

Accordingly, the present invention contemplates providing a rotatable, indicia-carrying drum or other movable carrier which bears information as to the relative type width of a plurality of type styles. This information is displayed adjacent a pair of logarithmic scales arranged so that basic type size calculations may be readily performed. The information relative to type width is represented on the drum by a pair of indices for each type style, one index corresponding to lower case characters and the other index corresponding to capital characters. Preferably these indices constitute the opposite ends of a solid bar or mark on the drum. A slidable logarithmic scale is supported parallel to the fixed inverse logarithmic scale. By positioning this slidable scale so that a number corresponding to the given line width is opposite one end of the indicating bar, the proper type size to fit that line width may be read from the fixed inverse logarithmic scale opposite the number, on the slidable logarithmic scale, giving the character count to be placed in the line.

In a more specific aspect the invention involves an identifying scale carrying indicia representing the various type styles for which said drum can be positioned, and an indicator movable with the drum along the identifying scale to indicate the particular type for which the drum is positioned. While the indicator may be moved in synchronism with the drum in any suitable manner it is preferable in the form of a helical line on the drum.

In another aspect the type calculator comprises an elongate member movable longitudinally and carrying a scale representing both type size and line length, another member movable transversely of said member and carrying a plurality of figure-group scales parallel to said scale, each figure-group scale comprising a series of indications corresponding to groups of figures of different widths, and a fixed index so located that, when said elongate scale is adjusted with a predetermined character height opposite said index, the length of the space required for the group of figures appears on the first scale opposite the indication on the second scale corresponding to the figure group to be used.

For the purpose of illustration a preferred embodiment of the invention is shown in the accompanying drawings in which—

Figure 2:
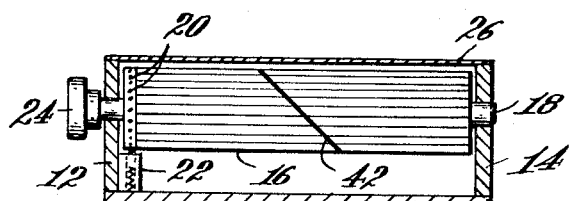
Figure 3:
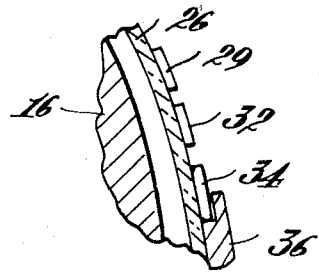
Figure 4:
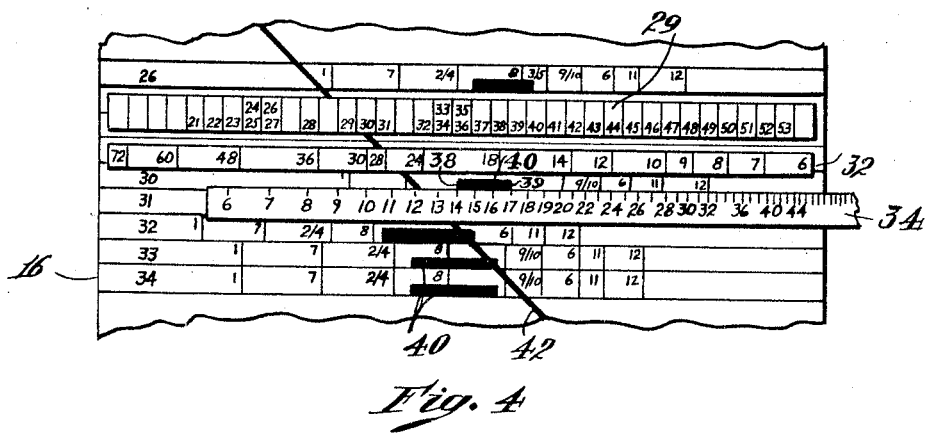

FIG. 1 is a perspective view of a type size calculator;
FIG. 2 is a front view, largely in section, of the calculator;
FIG. 3 is a sectional view showing the calculator scales; and
FIGURE 4 is a plan view of the calculator scales, one scale having been flattened from its normally cylindrical configuration.

The illustrated device involves a frame having a base member 10 and two end members 12 and 14. A cylindrical indicia-bearing drum 16 is supported within the frame on a shaft 18 journaled in the end members 12 and 14. A plurality of indentations 20 around the periphery of one end of the drum 16 permit a spring loaded indexing pin device 22 to hold the drum in any of a plurality of positions relative to the frame. A knob 24 fixed to the shaft 18 allows the drum to be rotated against this restraint. For each of its positions the drum carries the name of a type style and a pair of indices 38 and 39 whose purpose will be explained hereinafter. Preferably these indices constitute the ends of a solid bar or mark 40 on the drum.

The drum 16 is enclosed within the frame by a sheet of transparent plastic 26 which is curved to fit the end frame members 12 and 14. As may be seen in FIGS. 1 and 3 two fixed scales 29 and 32 are supported over the drum 16 by the plastic sheet 26. The scale 32 is an inverse logarithmic scale, the smaller numbers being to the right, and the scale 29 carries a series of numbers which identify the various type styles. In the example numbers are assigned as follows: 26 Bodoni Bold Italic; 27 Bodoni Bold; 30 Techno Extra Bold Italic; 31 Techno Extra Bold; 33 Stylon Light; and 34 Stylon Medium Italic. A third scale 34 is held slidingly in parallel relation to the scales 29 and 32 in a holder 36. This third scale 34 is a forward logarithmic scale arranged to complement the inverse logarithmic scale 32. The indicia on the drum 16 is visible between adjacent scales through the transparent sheet 26 and the remaining portions of the sheet may be opaqued as by painting.

The analog calculations performable with this device are, as in the apparatus disclosed in my aforesaid patent, based upon a recognition that, for many type face styles, there is a characteristic relation between the number of characters in a line of given length and the size of type which will fit. The relation is such that the number of characters, multiplied by the size of the type in points and divided by the length of the line in picas, equals a constant for the particular type style. This constant may be conveniently considered as being the relative type width of the particular type style. The present invention makes use of the properties of logarithmic scales to perform the necessary multiplications and divisions, the line length and character count being indicated on a forward logarithmic scale and the relative type width and the type size being read on an inverse logarithmic scale.

The nature and operation of the different scales and indicia shown is illustrated in FIG. 4. As mentioned previously the drum 16 carries in each position visible between the scales 32 and 34 the title of a particular style of type face and a solid indicia bar 40. Each style of type face is also designated by an arbitrary number, in this case the number 30 corresponding to the style of type face known as Techno Extra Bold Italic.

The left end 38 of the indicia bar 40 indicates, on the scale 32, the relative type width of the specific type style chosen for lower case characters while the right end 39 of the bar provides the same information for capital letters. From the illustration in FIG. 4 it will be noted that the relative width of the lower case Techno Extra Bold Italic type is approximately 21 while capital characters of the same style have a relative width of approximately 17.

Calculations for any given style type face may be conducted as follows, lower case characters alone being considered for the moment. The sliding scale 34, which is a forward logarithmic scale, is positioned so that the number representing the length of the space to be filled in picas is opposite the left end of the indicia bar 40. The appropriate size of type to fill the space can then be read from the scale 32 opposite the point on the scale 34 representing the character count involved. In the example illustrated in FIG. 4 the slidable scale 34 is positioned so as to permit calculation of appropriate type sizes to fit a space 14 picas wide. With the scale 34 so positioned, it can be seen directly that a character count of ten could be fit in such a line using 30 point type of Techno Extra Bold Italic style, that is the number 30 on the scale 32 is opposite the number 10 on the scale 34.

To facilitate the selection of a type style the present invention contemplates further that the drum 16 carry a helical scanning indicia 42 which preferably is of a color contrasting with the type style titles and indicia bars 40. The helical scanning indicia 42 is read on the fixed scale 29 which carries arbitrary numerical designations of the various type styles, each such number being positioned on the scale 29 at the point intersected by the helix 42 when the indicia bar 40 corresponding to the same type style is in position between the scales 32 and 34. In the example of FIG. 4 it will be noted that the helical indicia 42 intersects the scale 29 at the number 30 which is the number identifying the Techno Extra Bold Italic type style. In this way a particular type style may be easily found and brought into position or several different type styles may be compared for best fit into a given line width.

When a line of copy contains some words in capitals and some in lower case the calculation is facilitated by first converting the cap space into lower-case space. For example, in "RAYMOND RUGS are sold in Boston only" the character count of the words in caps is 12, including the space between the two words. To convert this into lower-case count the drum scale is set to the desired count, e.g. 30, the numeral 12 on scale 34 is placed at the index mark 38, and at index mark 39 the corresponding lower-case count is read as 17. Then 17 is added to the count of the lower-case words "are sold in Boston only" to obtain the total count, and with this total count the length of the required space is determined as above described.

The device may also be used to indicate the required space for various groups of market figures and the like of which the following are typical:

1—$0         7—0°°
2—$00        8—00°°
3—$000       9—000°°
4—$0°°       10—$0.00
5—$00°°      11—$00.00
6—$000°°     12—$000.00

For this purpose each drum scale is marked from 1 to 12 to indicate the space required for each of the different groups of figures numbered 1 to 12. For example if the figure is $25⁰⁰ and the type style is 30 and the type height is 46, the procedure is as follows. Set the drum with scale 30 showing between scales 32 and 34. Set scale 34 with 46 at the right hand end of scale 32 which serves as a fixed index. Then on scale 34 read opposite 5 because $25⁰⁰ corresponds in width with $00⁰⁰, which is 5 in the aforesaid table. Thus a space of 20 agate lines or 8½ picas is required in this example. In this use of the device the sliding scale 32 indicates character height instead of character count.

It should be understood that while a particular embodiment has been shown for the purpose of illustration only, the present invention includes all modifications and equivalents falling within the scope of the appended claims.

I claim:

1. A type size calculator comprising a frame, a drum journaled in said frame, said drum being rotatable between a plurality of discrete positions, each position corresponding to one style of type face, a fixed inverse logarithmic scale supported by said frame longitudinally adjacent to said drum, a forward logarithmic scale slidable in said frame parallel to said inverse logarithmic scale, and a plurality of indicia carried by said drum, a pair of indices for each said position indicating on said fixed inverse logarithmic scale the relative width of characters of the corresponding type style for lower case and capital characters respectively.

2. A type size calculator according to claim 1 in which each pair of indices carried by said drum is in the form of a bar, one end of which indicates the width of lower case characters and the other end of which indicates the width of capital characters.

3. A type size calculator according to claim 1 further comprising an identifying scale carrying indicia representing the various type styles for which said drum can be positioned, and an indicator movable with said drum for indicating on said identifying scale the type style for which said drum is positioned.

4. A type size calculator according to claim 3 in which said indicator is a spiral scanning indicia carried by said drum.

5. A type calculator comprising: an elongate member movable longitudinally and carrying a logarithmic scale capable of representing, alternatively, type size and line length; a drum the surface of which is movable transversely of said scale by rotation of said drum around an axis extending parallel to said elongate member, said surface carrying a plurality of figure group scales extending parallel to said longitudinally movable scale, each of said figure group scales having a plurality of indications each of whose position along the scale corresponds to the relative length of a commonly used group of figures; and a fixed index, whereby when said longitudinally movable scale is positioned with a predetermined character height opposite said index the length of the space required for the various commonly used group of figures appears on the longitudinally movable scale opposite the corresponding indications on the figure group scale.

References Cited in the file of this patent

UNITED STATES PATENTS

| | | |
|---|---|---|
| 1,354,977 | Kammeyer | Oct. 5, 1920 |
| 2,088,395 | Bayard | July 27, 1937 |
| 2,378,473 | Evangelista | June 19, 1945 |
| 2,725,029 | Ammerman | Nov. 29, 1955 |